July 12, 1960
T. MUEGERL ET AL
2,944,442
DIFFERENTIAL GEARS
Filed Sept. 9, 1958
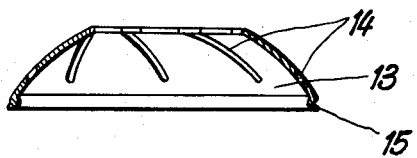
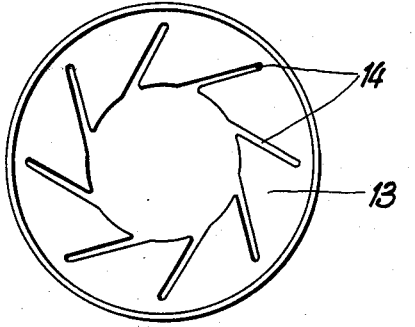
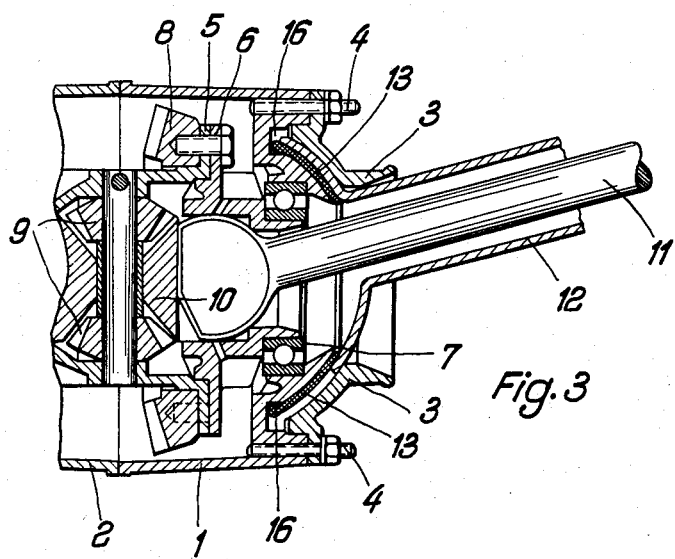

United States Patent Office 2,944,442
Patented July 12, 1960

2,944,442
DIFFERENTIAL GEARS

Thomas Muegerl and Ekkehard Hoyer, Wolfsburg, Germany, assignors to Volkswagenwerk G.m.b.H., Wolfsburg, Germany, a firm of Germany
Filed Sept. 9, 1958, Ser. No. 760,025
Claims priority, application Germany Sept. 11, 1957
6 Claims. (Cl. 74—713)

The present invention relates to differential gears and more particularly to a differential driving gear having an axle tube for receiving a driving shaft, which tube is journalled for universal motion on a spherical surface in the driving gear casing. For this purpose the end of the axle tube is enlarged in known manner in the form of a partial-spherical shell by which it rests on the spherical surface of the driving gear and is secured to the casing by a correspondingly spherical cover.

It has been found that, in particular, when light metal, such as magnesium, is used for the gear casing and for the cup-shaped cover, stresses originating from the axle tube cause one-sided deformations to occur on the spherical surface after the driving gear has been in use for a comparatively long period. These deformations on the spherical surface make the whole cast body useless and are a cause of great expense to a vehicle owner whose vehicle is fitted with such a differential driving gear.

According to the present invention a differential driving gear has an axle tube which is journalled for universal motion by a partially-spherical shell-like part thereof between a partially-spherical surface of the driving gear casing and a bearing cover attached thereto, a bearing lining of hard synthetic material being inserted between the shell-like part of the axle tube and the partially-spherical surface of the casing and/or between the shell-like part of the axle tube and the cover.

The synthetic material is preferably a hard polyamide.

This bearing lining may have slots or incisions extending from the bore of the lining, the slots or incisions preferably extending spiral-wise from the bore, the slots or incisions appearing as substantially straight lines when viewed axially of the liner. The elastic construction of the liner and the structure of its material absorbs the high, one-sided stresses causing deformation of the material and prevents the wear of the spherical surface which may make the entire gear casing useless.

The invention will be further described by way of example with reference to the accompanying drawings in which:

Figs. 1 and 2 are an elevation and a cross section respectively of a cup-shaped bearing lining, and Fig. 3 is a partial section taken through a differential driving gear with the lining inserted.

In the differential driving gear shown in section in Fig. 3, 1 and 2 are two symmetrical halves of the casing, one of which is shown in the drawing as provided with a bearing cover 3 secured by the stud bolts 4 and nuts. An inner differential gear box 5 and 6 is journalled by means of ball bearings 7 for rotation in the casing 1, 2. The main shaft drive bevel wheel 8, which is driven in known manner by a pinion (not shown) and is attached to the box 5, 6, transmits the driving torque via the box 5, 6 to the differential spider pinions 9. The latter mesh in known manner with the bevel wheels 10 which are universally jointed to the driving shaft 11. The driving shaft 11, driving a wheel of a mechanically propelled vehicle, is enclosed in an axle tube 12 which is journalled to move universally by its end on a spherical surface of the gear casing 1 with the interposition of a plastic lining 13. The axle tube is retained on the casing 1 by the cover 3 forming a ball cap. The lining 13 is constructed with its outer edge 15 like a bead on the inside and in the form of a recessed bead on the outside, the beaded edge 15 being located in a recess 16 in the spherical surface of the gear casing 1, 2 so that, when the axle tube 12 moves it slides by its partial spherical end on the cup-shaped lining 13. The cup-shaped lining 13 has slots 14 leading from the bore of the lining and serving to assist the lining in fitting on the spherical surfaces. The slots may be formed radially of the lining but in the lining shown in Figs. 1 and 2 the slots 14 extend spiral-wise from the bore although they appear in Fig. 2 as straight lines tangential to a circle of slightly smaller diameter than the bore when viewed axially of the lining as in Fig. 1.

Polyamide is a suitable hard synthetic material for the bearing lining 13. The lining may also be manufactured of a wear-resistant plastic such as low pressure polyethylene.

Additionally or alternatively a bearing lining may be inserted between the axle tube 12 and the cover 3.

We claim:

1. In a differential driving gear having a housing, a partially spherical surface on said housing, a partially spherical bearing lining abutting said partially spherical surface on said housing, an axle tube having a partially spherical shell-like part abutting said bearing lining, and a bearing cover having a partially spherical surface for engaging the shell-like part of the axle tube, the improvement of a bearing lining having spaced slots extending from the bore of the lining toward its outer periphery, said bearing lining being made from a synthetic plastomeric material selected from the group consisting of polyamide and low pressure polyethylene.

2. The differential driving gear assembly of claim 1 in which the bearing lining is made from polyamide.

3. The differential driving gear assembly of claim 1 in which the bearing lining is made from low pressure polyethylene.

4. The differential driving gear assembly of claim 1 in which the slots therein are directed radially.

5. The differential driving gear assembly of claim 1 in which the slots extend spiralwise from the bore, the slots appearing as straight lines when viewed axially of the lining.

6. In a differential driving gear having a housing provided with a partially spherical convex surface, a partially spherical bearing lining abutting said partially spherical surface of said housing, an axle tube having a partially spherical shell-like part in which the inner surface thereof abuts the bearing lining, and a bearing cover having a partially spherical surface for engaging the outer surface of the shell-like part of the axle tube, the improvement of a bearing lining having circumferentially spaced slots extending from the bore of the lining toward its outer periphery, and having a peripheral edge in the form of a bead on the inside of the lining, said bead being located in a complementary recess around the partially spherical surface of the housing, said bearing lining being a plastomeric material selected from the group consisting of polyamide and low pressure polyethylene.

References Cited in the file of this patent

UNITED STATES PATENTS

| | | |
|---|---|---|
| 1,797,578 | Hoffman | Mar. 24, 1931 |
| 1,833,051 | Leipert | Nov. 24, 1931 |
| 2,459,598 | Stott | Jan. 18, 1949 |
| 2,615,763 | Wolford | Oct. 28, 1952 |
| 2,847,837 | Baker | Aug. 19, 1958 |

FOREIGN PATENTS

| | | |
|---|---|---|
| 787,767 | Great Britain | Dec. 18, 1957 |
| 1,004,497 | Germany | Mar. 14, 1957 |